(12) United States Patent
Farah et al.

(10) Patent No.: US 7,581,399 B2
(45) Date of Patent: Sep. 1, 2009

(54) DAMPED COIL PIN FOR ATTACHMENT HANGER HINGE

(75) Inventors: Jorge I. Farah, Glastonbury, CT (US); Michael E. Nackoul, Wethersfield, CT (US); José M. Cintrón, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 615 days.

(21) Appl. No.: 11/326,004

(22) Filed: Jan. 5, 2006

(65) Prior Publication Data

US 2007/0151229 A1    Jul. 5, 2007

(51) Int. Cl.
*F02K 1/82* (2006.01)
(52) U.S. Cl. .............. 60/770; 60/796; 248/49; 411/521
(58) Field of Classification Search .................. 60/39.5, 60/232, 770, 796, 798, 799; 16/253, 262; 248/49, 58, 60, 62, 63; 411/521
See application file for complete search history.

(56) References Cited

U.S. PATENT DOCUMENTS

| 3,557,402 | A | * | 1/1971 | Koehl ...................... 16/380 |
| 3,826,088 | A | * | 7/1974 | Nash et al. .................. 60/766 |
| 4,438,626 | A |   | 3/1984 | Berestecki |
| 4,465,252 | A | * | 8/1984 | Donovan et al. .............. 248/60 |
| 4,747,543 | A |   | 5/1988 | Madden |

\* cited by examiner

*Primary Examiner*—Louis J Casaregola
(74) *Attorney, Agent, or Firm*—Kinney & Lange, P.A.

(57) ABSTRACT

The present invention is directed toward a suspension system for mounting an exhaust duct liner within an exhaust duct of a gas turbine engine. An exhaust liner suspension system comprises a hanger, a bracket and a coil pin. The hanger comprises a first end for connecting with an exhaust duct and a second end having a hinge pin socket. The bracket comprises a base for connecting with an exhaust duct liner and a pedestal having a hinge pin bore. The coil pin is insertable in the hinge pin socket and the hinge pin bore thereby pivotably connecting the hanger and the bracket. The coil pin also provides a dampened connection between the hanger and the bracket.

9 Claims, 5 Drawing Sheets

DAMPED COIL PIN FOR ATTACHMENT HANGER HINGE

This invention was made with U.S. Government support under contract number N00019-02-C-3003 awarded by the United States Navy, and the U.S. Government may have certain rights in the invention.

BACKGROUND OF THE INVENTION

This invention relates generally to gas turbine engines and more particularly to exhaust duct liner attachment systems and methods. In gas turbine powered aircraft, it is necessary to protect the exhaust duct with an insulating shield in order to prevent the heated core gases from damaging the exhaust duct. Typically, exhaust ducts are made from titanium or titanium alloys and have temperature limits in the vicinity of 400° F. (~204.4° C.). Exhausted core gases can reach temperatures upwards of 35000° F. (~1648.89° C.). It is, therefore, necessary to line exhaust ducts with a material capable of withstanding the peak temperatures of the exhaust gas and that prevents the exhaust duct from reaching its temperature limitations.

For particular operations, particularly in military operations, it is desirable to have aircraft with conventional take-off and landing (CTOL) capabilities, and short take-off vertical landing (STOVL) capabilities. CTOL requires conventional thrusting of the aircraft in the horizontal direction, while STOVL requires thrusting of the aircraft in vertical and intermediate directions. Some dual capability aircraft designs thus employ variable direction exhaust ducts for directing thrust produced by the exhaust nozzle in both the horizontal and vertical directions. Variable direction exhaust ducts typically comprise multiple co-axial exhaust duct segments having angled junctions, whereby the segments can be rotated with respect to each other to redirect the direction of thrust. The exhaust duct segments interface through a swivel bearing joint, which extends partially into the exhaust duct. This has the effect of restricting the diameter of the exhaust duct near the swivel bearing joint. In order to properly pre-load the swivel bearings, it is typically necessary to assemble the exhaust duct segments before attaching exhaust duct liners to the exhaust duct segments. Exhaust duct liners must have an outer diameter that allows them to pass through the restricted inner diameter resulting from the presence of the bearing joints in the assembled exhaust duct. It is, therefore, necessary to have an exhaust duct liner suspension system that spans the distance between the exhaust duct and exhaust duct liner, while also being insertable past the bearing joints. Various systems and methods can be employed to attach duct liners to exhaust ducts for both conventional and variable exhaust ducts, such as three bearing swivel ducts (3BSDs). It is desirable to increase the performance of these suspension systems, such as reducing vibration, while also reducing their cost and weight.

BRIEF SUMMARY OF THE INVENTION

The present invention is directed toward a suspension system for mounting an exhaust duct liner within an exhaust duct of a gas turbine engine. An exhaust liner suspension system comprises a hanger, a bracket and a coil pin. The hanger comprises a first end for connecting with an exhaust duct and a second end having a hinge pin socket. The bracket comprises a base for connecting with an exhaust duct liner and a pedestal having a hinge pin bore. The coil pin is insertable in the hinge pin socket and the hinge pin bore thereby pivotably connecting the hanger and the bracket. The coil pin also provides a dampened connection between the hanger and the bracket.

DETAILED DESCRIPTION

Figure 1:
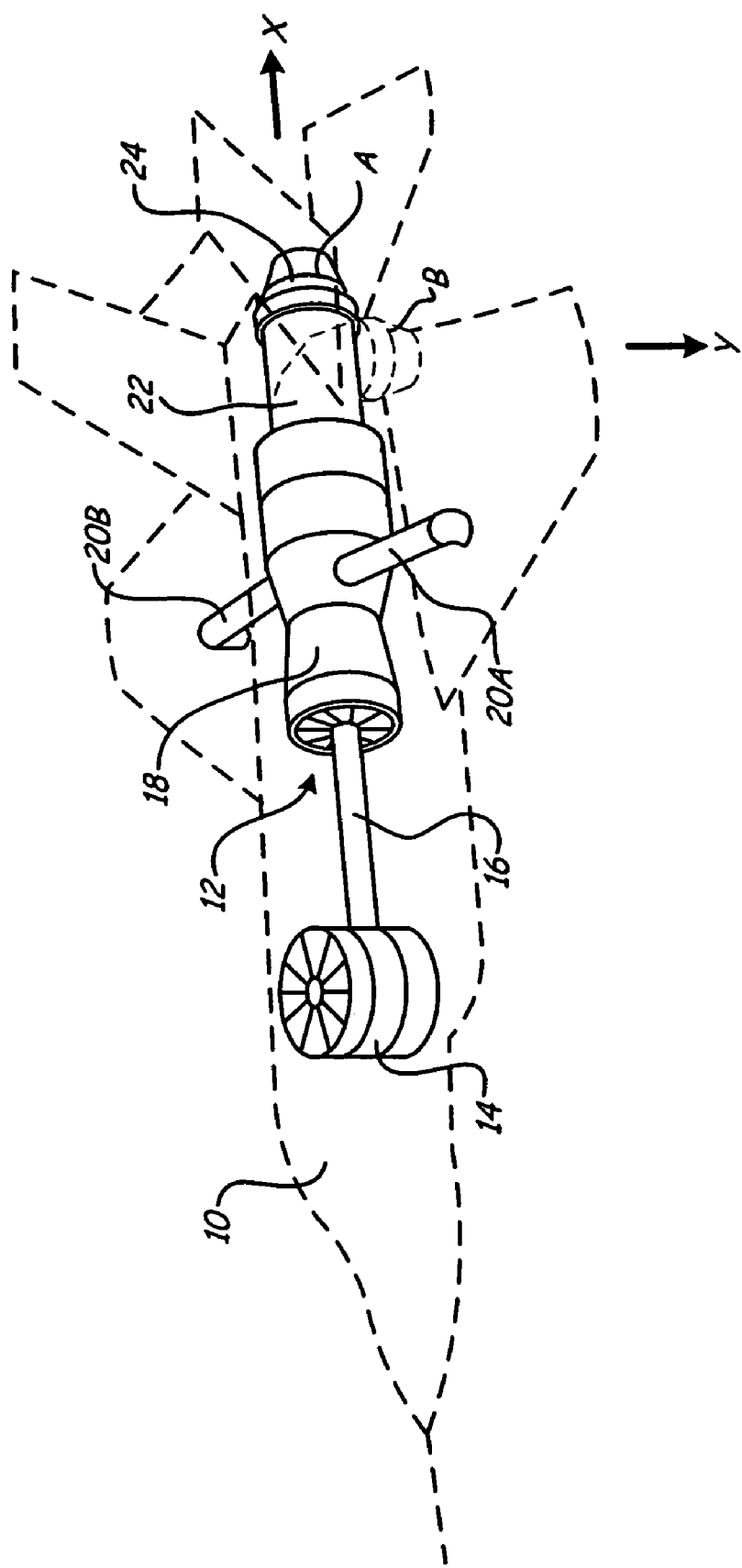
FIG. 1 shows a jet-powered aircraft in phantom having a STOVL capable gas turbine engine.

FIG. 1 shows jet-powered aircraft 10 having short take-off vertical landing (STOVL) gas turbine engine 12. Engine 12 includes multiple thrust producing and thrust directing elements which enable aircraft 10 to take-off on a shortened runway and land vertically. Engine 12 includes lift fan 14, lift fan shaft 16, power plant 18, control ducts 20A and 20B, three bearing swivel duct 22 and exhaust nozzle 24. Power plant 18 is the primary thrust-producing element of engine 12 and is used to produce thrust oriented in the x direction. Three bearing swivel duct (3BSD) 22 directs the thrust of power plant 18 in the x direction when in configuration A (as shown by 3BSD 22 in solid lines). 3BSD 22 is adjustable to redirect the thrust of power plant 18 in the y direction when in configuration B (as shown by 3BSD 22 in dashed lines). 3BSD 22 is also be used to produce thrust in intermediate directions. Nozzle 24 increases and focuses the thrust produced by power plant 18 and is secured to the tail end of 3BSD 22. 3BSD 22 is used in configuration A during traditional take off and flight operations of aircraft 10 in the x direction. 3BSD 22 is positioned in intermediate directions to facilitate short take-off operations. 3BSD 22 is positioned in configuration B to assist lift fan 14 in vertical landing operations. Lift fan 14 is selectively driven by power plant 18 through lift fan shaft 16, and is used to produce thrust in the y direction near the forward portion of aircraft 10. With 3BSD 22 producing thrust near the aft portion of aircraft 10, lift fan 14 and power plant 18 control the pitch of aircraft 10. During vertical landing operations, control ducts 20A and 20B redirect a portion of the thrust produced by power plant 18 in the y direction underneath the wings, at a location away from the axis on which power plant 18 and lift fan 14 produce thrust in the y direction. Control ducts 20A and 20B are selectively engaged to balance the roll of aircraft 10 during vertical landing and take-off operations.

Figure 2A:
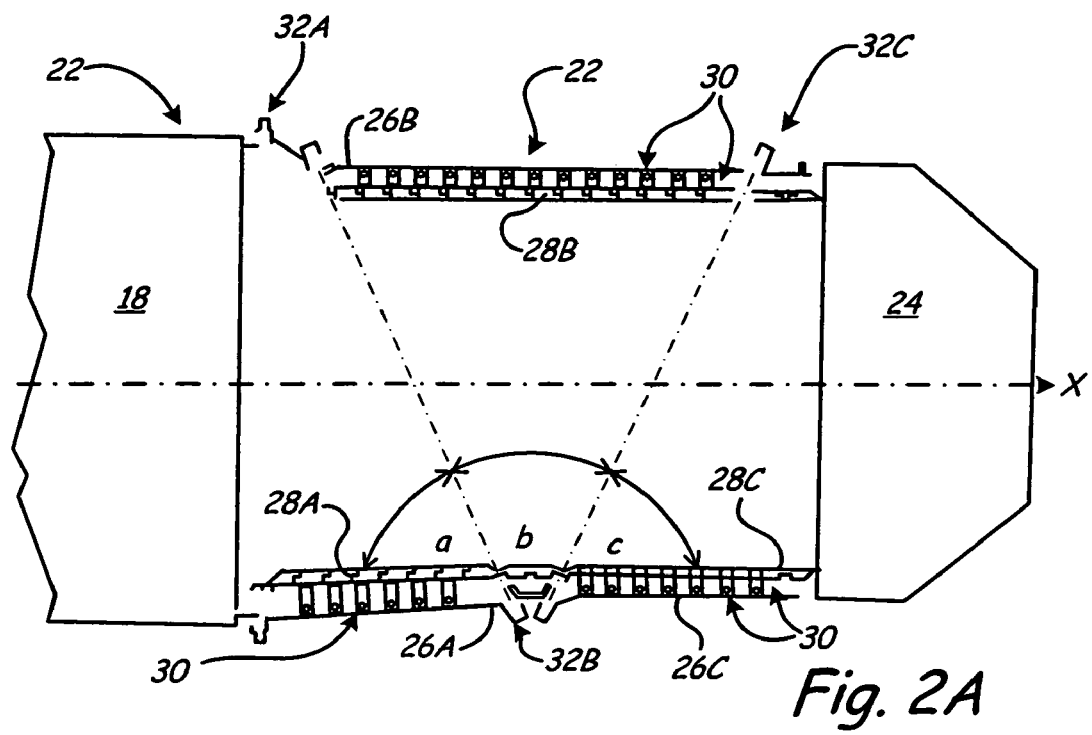
FIG. 2A shows a three bearing swivel duct of FIG. 1 configured for conventional operation.
Figure 2B:
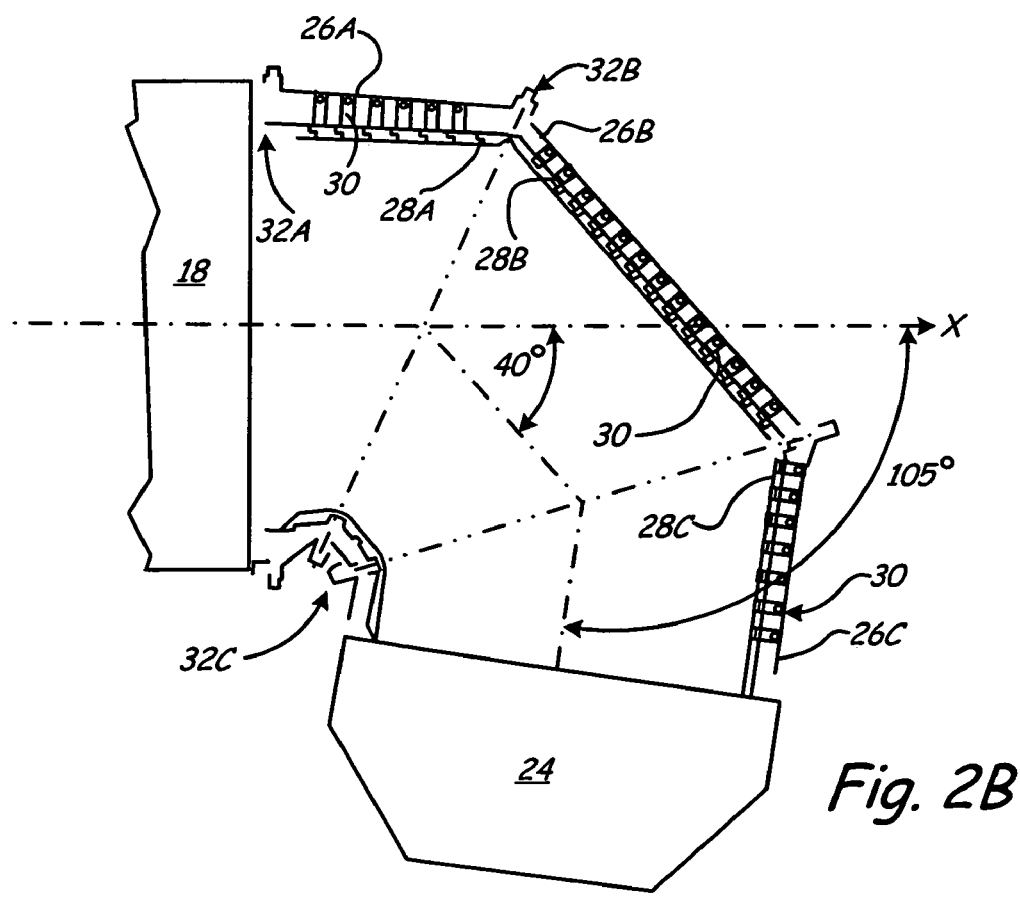
FIG. 2B shows the three bearing swivel duct of FIG. 2A configured for vertical landing or take-off operation.

FIG. 2A shows three bearing swivel duct (3BSD) 22 of FIG. 1 in configuration A with nozzle 24 oriented along the x axis. FIG. 2B shows 3BSD 22 in configuration B with nozzle 24 oriented 105° from the x axis. 3BSD 22 is positioned between power plant 18 and nozzle 24 of engine 12. 3BSD 22 comprises front duct 26A, intermediate duct 26B, rear duct 26C, front liner 28A, intermediate liner 28B, rear liner 28C, a plurality of suspension systems 30 and swivel bearings 32A-32C.

Front duct 26A is connected with power plant 18 along a vertical axis using forward swivel bearing 32A. Swivel bearing 32A allows front duct 26A to rotate 360° with respect to power plant 18. Swivel bearing 32A is controlled by a central control system of aircraft 10 that positions front duct 26A for each desired operational mode of aircraft 10. Similarly, intermediate duct 26B is connected with front duct 26A using intermediate swivel bearing 32B. Swivel bearing 32B is centrally controlled and allows intermediate duct 26B to rotate 360° with respect to front duct 26A. The body of intermediate duct 26B is angled at angle b and the aft edge of front duct 26A is angled at angle a such that when they rotate with respect to each other, the position of nozzle 24 rotates about the x-axis. Likewise, rear duct 26C is connected with intermediate duct 26B using aft swivel bearing 32C. Swivel bearing 32C is centrally controlled and allows rear duct 26C to rotate 360° with respect to intermediate duct 26B. With the body of intermediate duct 26B being angled at angle b, the forward edge of rear duct 26C is angled at angle c such that when it rotates, the position of nozzle 24 rotates about the x-axis. Angles a, b and c are selected such that in configuration A 3BSD is generally horizontal, but can pivot to reposition nozzle 24. FIG. 2B shows front duct 26A rotated 180° with respect to power plant 18, intermediate duct 26B rotated 180° with respect to front duct 26A and rear duct 26C rotated 180° with respect to intermediate duct 26B. Thus, due to the angles at which front duct 26A, intermediate duct 26B and rear duct 26C are joined (angles a, b and c), 3BSD 22 is angled downward a total of 105° with respect to the x axis in configuration B. Nozzle 22 can also be oriented 40° from the x axis by rotating only front duct 26A and intermediate duct 26B 180° each.

Because of manufacturing and other considerations, exhaust liners 28A-28C have smaller diameters than exhaust ducts 26A-26C and cannot be mounted directly to the exhaust ducts. Therefore, front liner 28A, intermediate liner 28B and rear liner 28C are suspended from front duct 26A, intermediate duct 26B and rear duct 26C, respectively, using a plurality of suspension systems 30. Suspension systems 30 span the difference in diameters of ducts 26A-26C and liners 28A-28C and can be tailored to for specific lengths. Typically there are about ten to fifteen rows of suspension systems per duct segment, with the bulk of them concentrated near the widest sections of each duct segment. To further facilitate assembly and disassembly, suspension systems 30 utilize a hinged hanger system.

Figure 3:
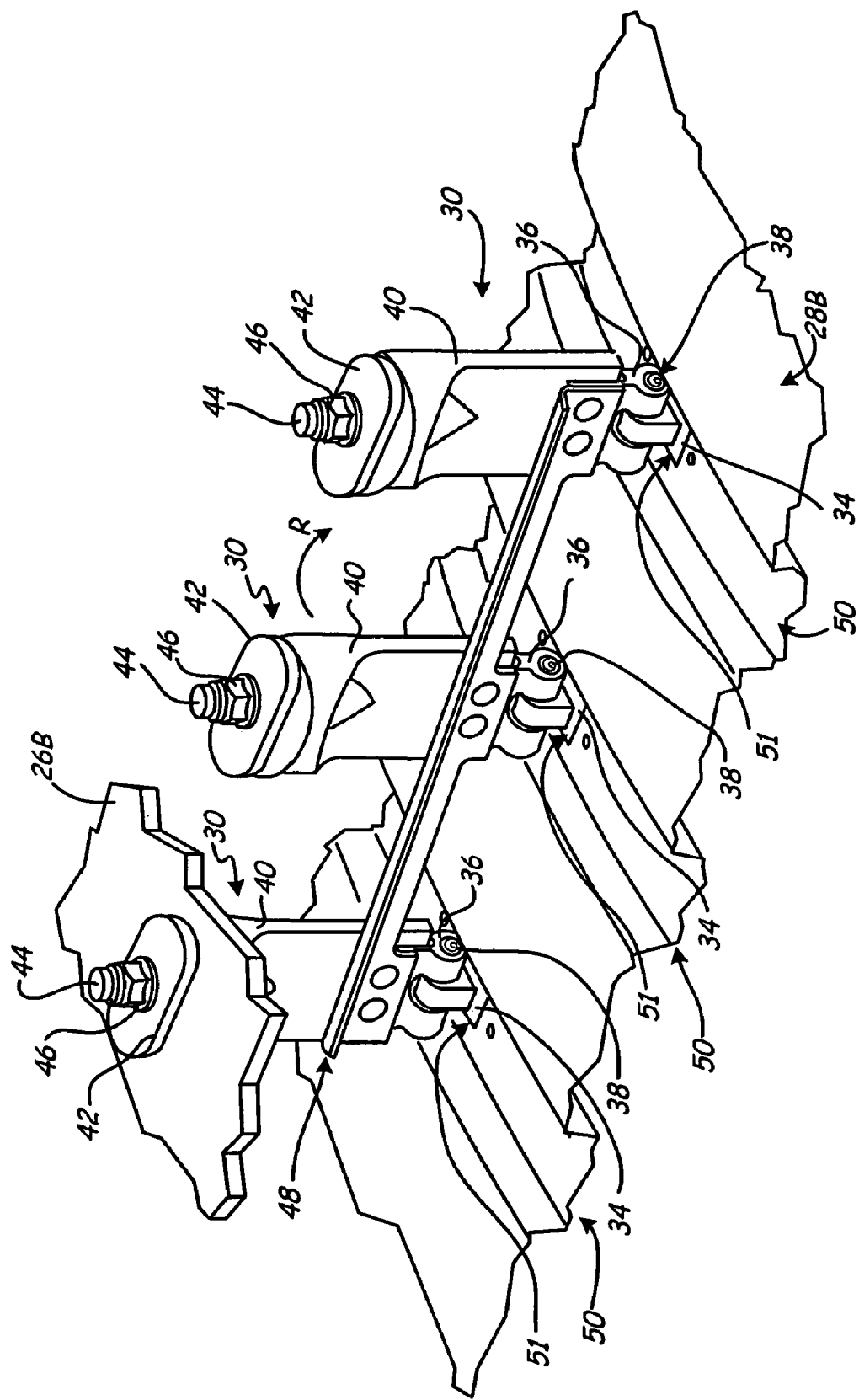
FIG. 3 shows a cut-away portion of the three bearing swivel duct of FIGS. 2A and 2B.

FIG. 3 shows a cut-away portion of intermediate duct 26B and intermediate duct liner 28B connected by suspension systems 30 of FIGS. 2A and 2B. Suspension systems 30 include cold sheet bracket 34, hinge 36, coil pin 38, duct bracket, or hanger, 40, flange washer 42, T-bolt 44, lock nut 46 and axial stiffener 48. Suspension systems 30 connect intermediate duct 26B with intermediate liner 28B.

Cold sheet bracket 34 is connected with intermediate duct liner 28B at corrugation 50. Cold sheet bracket 34 is inserted through hole 51 in duct liner 28B from underneath duct liner 28B. Hinge 36 forms a rotatable connection with bracket 34 utilizing coil pin 38. Coil pin 38 comprises a thin metal sheet wound about a central axis to form a spiral. Coil pin 38 is compression fit into a bore in cold sheet bracket 34 such that coil pin will not rotate with respect to cold sheet bracket 34. Typically, each cold sheet bracket, hinge and coil pin are pre-assembled as a hinge assembly before the cold sheet bracket is assembled with exhaust liner 28B. Hinge 36 receives duct bracket 40, which connect with intermediate duct 26B. Hinges 36 are joined with each other through axial stiffener 48, which also provides axial load sharing amongst brackets 40. Bracket 40, hinge 36 and axial stiffener 48 are fastened together with, for example threaded fasteners or rivets.

T-bolt 44 is inserted through intermediate duct 26B into duct bracket 40. Flange washer 42 is placed around T-bolt 44 and into intermediate duct 26B and duct bracket 40 to restrain T-bolt 44 from rotating while torquing lock nut 46 which secures intermediate duct 26B between bracket 40 and flange washer 42. Flange washer 42 provides for proper orientation of T-bolt 44 and load distribution functions. For liner installation and disassembly, when lock nut 46 and T-bolt 44 are not installed, bracket 40 is rotatable about coil pin 38. Brackets 40 rotate in unison using stiffener 48 and rotate downward into corrugations 50 as indicated by arrow R. Thus, suspension system 30 are insertable past swivel bearing joints 32A-32C during assembly of 3BSD 22. Since brackets 40 are designed to rotate, there is, inherently, some play in each suspension system 30. Coil pin 38 of the present invention reduces the amount of vibration produced by interaction of bracket 34, hinge 36 and bracket 40.

Figure 4:
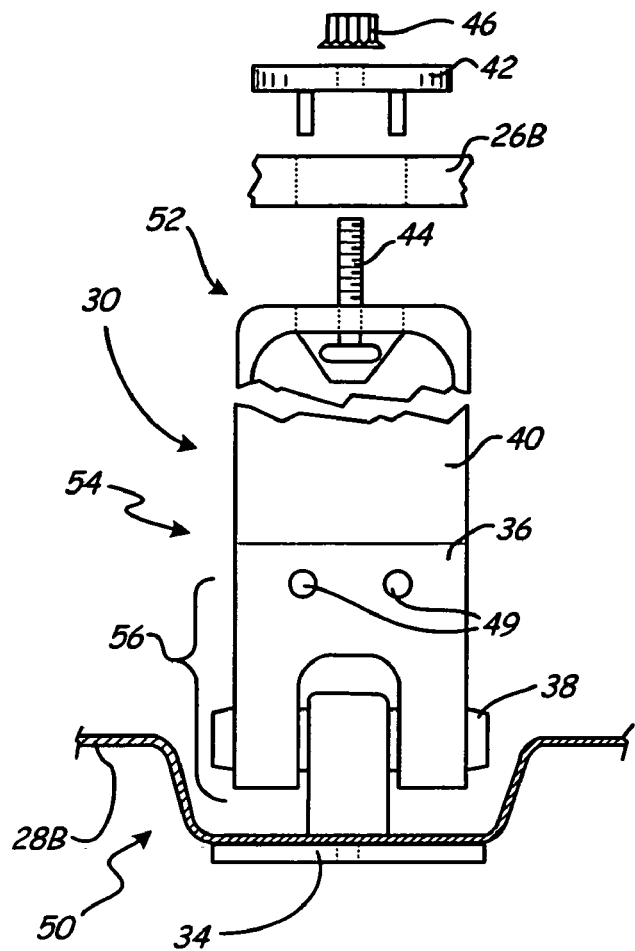
FIG. 4 shows a partially exploded, partially broken view of the exhaust liner suspension system of the present invention.

FIG. 4 shows a partially exploded, partially broken view of suspension system 30 including coil pin 38 of the present invention. Suspension system 30 is exemplary of the suspension system of the present invention. Bracket 40, or hanger 40, is the primary member used for connecting exhaust liner 28B with exhaust duct 26B. At first end 52, bracket 40 is connected with exhaust duct 26B with T-bolt 44 and locking nut 46 through holes in duct 26B and the top of bracket 40.

At second end 54, hinge mechanism 56 connects bracket 40 with exhaust liner 28B. Hinge mechanism 56 is comprised of hinge 36, coil pin 38 and bracket 34. Hinge mechanism. 56 is inserted through hole 51 from underneath exhaust liner 28B with coil pin 38 perpendicular to the axis of exhaust liner 28B and then rotated 90° to the orientation shown in FIG. 4 once inserted. Cold sheet bracket 34 is fastened to intermediate liner 28B between corrugation 50 of duct 28B so that bracket 40 can be folded down into corrugation 50. Corrugation 50 provides a secondary retention system for coil pin 38 by preventing coil pin 38 from fully disengaging bracket 34 and hinge 36 should it fail to hold in place. Cold sheet bracket 34 is connected to intermediate liner 28B with, for example, threaded fasteners or rivets. Coil pin 38 is forced fit with the bore in bracket 34 and is loose fit with the hinge pin sockets in hinge 36. Thus, coil pin 38 is not rotatable with respect to bracket 34, but hinge 36 is rotatable with respect to coil pin 38.

Figure 5:
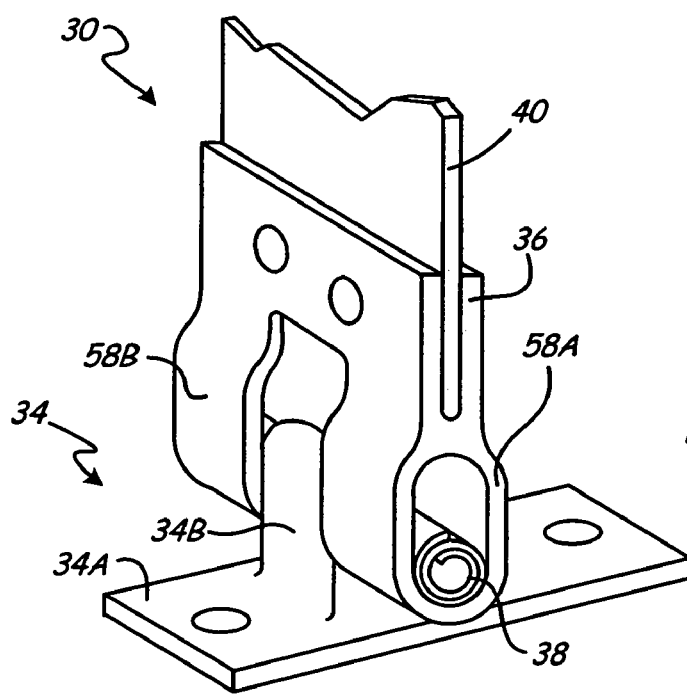
FIG. 5 shows a coil pin of the present invention connecting a hanger and a bracket of an exhaust duct liner suspension system.

FIG. 5 shows the insertion of coil pin 38 into the bore of cold sheet bracket 34 and the pin sockets of hinge 36. Cold sheet bracket 34 includes base member 34A for connecting with exhaust liner 28B, and pedestal member 34B for providing a bore for coil pin 38. Hinge 36 includes a U-shaped bracket for receiving duct bracket 40, and bores 49 for fastening hinge 36 with bracket 40 using, for example, threaded fasteners or rivets. Hinge 36 includes two hinge pin sockets 58A and 58B for receiving coil pin 38. Sockets 58A and 58B include oval shaped bores for loosely receiving coil pin 38 so that hinge 36 can rotate about coil pin 38. The oval shaped bores also allow for vertical movement of hinge 36. With T-bolt 44 and locking nut 46 removed, hinge 36 moves downward with respect to coil pin 38 thus enabling hinge 36 to rotate downward without interference from intermediate duct 26B. When bracket 40 is installed, T-bolt 44 pulls the bottom of hinge 36 into contact with coil pin 38, putting bracket 40 into tension.

Cold sheet bracket 34 includes a circular bore for tightly receiving coil pin 38 and preventing its rotation within cold sheet bracket 34. Sockets 58A and 58B are axially aligned with the bore of cold sheet bracket 34 and coil pin 38 so that coil pin 38 can be simultaneously inserted into the bore of cold sheet bracket 34 and sockets 58A and 58B. Therefore, bracket 40 and hinge 36 rotate on coil pin 38 thereby allowing bracket 40 to fold down into corrugation 50.

Figure 6:
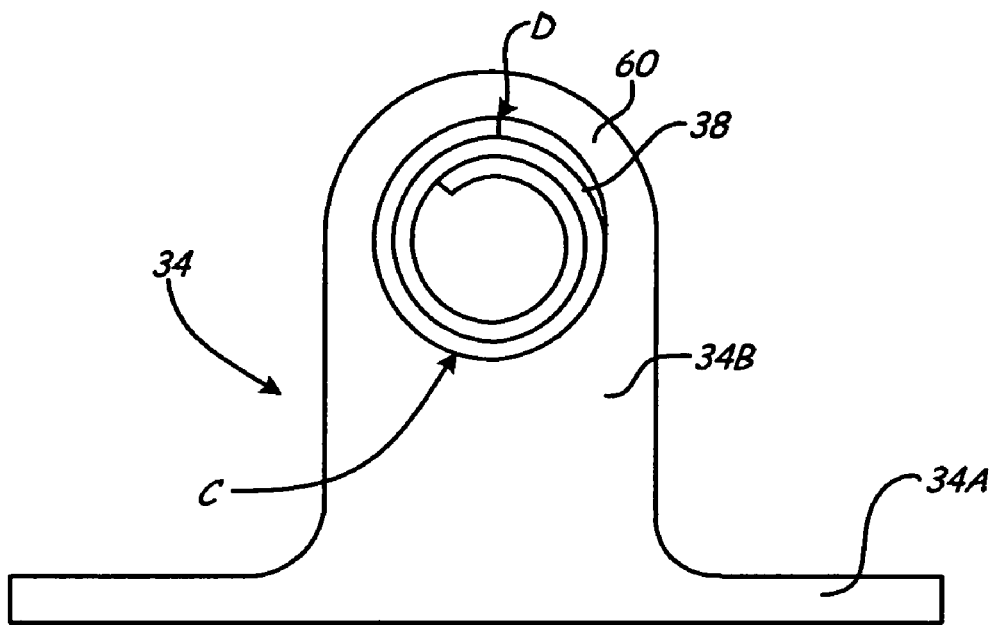
FIG. 6 shows a front view of the coil pin of the present invention inserted in a bracket of an exhaust duct liner suspension system.
Figure 7:
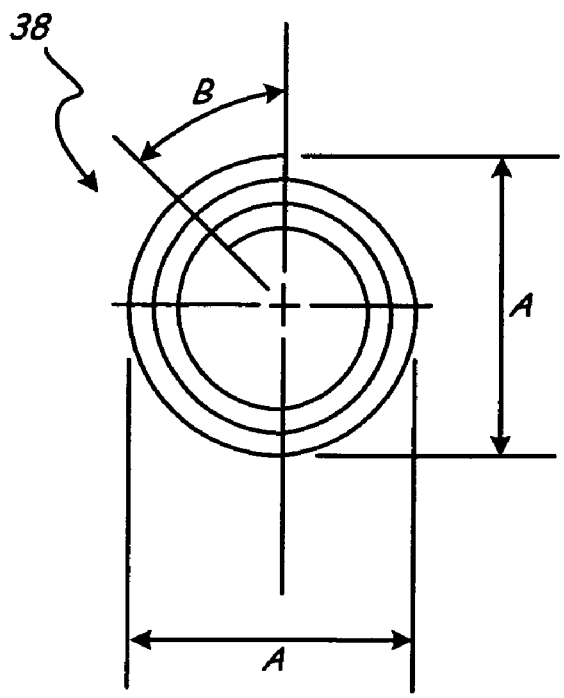
FIG. 7 shows the winding of the coil pin of the present invention.

FIG. 6 shows the positioning of coil pin 38 within the bore of cold sheet bracket pedestal 34B. FIG. 7 shows the winding of coil pin 38 of the present invention. Coil pin 38 is press fit into bore 60 of cold sheet bracket 34. Coil pin 38 is produced by rolling a sheet of metal to form a coil having a spiral shape. Coil pin 38 can be made of any suitable aircraft grade alloy, with 302 stainless steel and nickel alloys being preferred. In one embodiment, coil pin 38 is produced from a metal sheet 0.875 inches (~2.223 cm) wide. In one embodiment, coil pin 38 is wrapped around its center axis approximately 2.0 to approximately 2.25 times (or from about two complete wraps to about 45° past two complete wraps), as shown by angle B in FIG. 7. This results in approximately 270° to approximately 315° of contact between coil pin 38 and bore 60, as shown by arrow C in FIG. 6. This is an improvement over traditional slotted pins that essentially provide only three points of contact along the bore they are inserted into.

Coil pin 38 has diameter A, which is selected to be slightly larger than the diameter of bore 60 when not compressed. In one embodiment, coil pin 38 has a diameter of approximately 0.21875 inches (~0.556 cm). When coil pin 38 is pressed into bore 60, it compresses slightly and pushes out against bore 60, thus providing a damped interference fit connection between bracket 34 and coil pin 38. The resilient properties of coil pin 38 reduce the need for tight tolerancing in producing bore 60 in bracket 34, which contributes to cost savings in the production of suspension system 30. Bore 60 of bracket 34 does not have to be produced to the precise diameter required for forming a forced fit with coil pin 28. Use of coil pin 38 also eliminates the need for having to produce a traditional solid machined pin having the precise diameter required for forming a force fit with bore 60. This eliminates machining procedures in the production of suspension system 30, which is particularly advantageous when working with the expensive nickel and titanium alloys used in the aerospace industry.

Coil pin 38 also assists in the assembly of suspension system 30 by reducing variation in assembly. Since coil pin 38 is compressible, the variation from pin to pin in the force required to insert coil pin 38 is smaller than the variation for slotted pins. In one embodiment the insertion force variation for coil pin 38 is approximately +/−20%, as compared with +/−50% for a slotted pin. This facilitates streamlined manufacture of suspension system 30.

At elevated temperatures during operation of engine 12, coil pin 38 and bracket 34 will expand resulting in the diameters of coil pin 38 and bore 60 growing larger. The material used to produce coil pin 38 is selected to have a higher coefficient of thermal expansion than that of the material used for bracket 34. Thus, coil pin 38 will increase in diameter an amount greater than bore 60 increases thereby retaining the force fit between the two bodies. The coil winding characteristics of coil pin 38 also result in the diameter of coil pin 38 expanding a greater amount than that of a solid hinge pin. This further ensures that a tight fit is maintained between bore 60 and coil pin 38.

Coil pin 38 also has only one sharp point of contact with bore 60, indicated with arrow D. Traditional slotted pins have two edges along the slot that produce sharp points of contact with bores they are inserted into. It is desirable to eliminate sharp contact points with bore 60 to reduce the potential for damaging and weakening the inside of bore 60.

Although the present invention has been described with reference to preferred embodiments, workers skilled in the art will recognize that changes may be made in form and detail without departing from the spirit and scope of the invention.

The invention claimed is:

1. An exhaust liner suspension system for use in a gas turbine engine exhaust duct, the suspension system comprising:
   a hanger comprising:
      a first end for connecting with an exhaust duct; and
      a second end having a hinge pin socket;
   a bracket comprising:
      a base for connecting with an exhaust duct liner; and
      a pedestal having a hinge pin bore; and
   a coil pin insertable in the hinge pin socket and the hinge pin bore thereby pivotably connecting the hanger and the bracket;
   wherein the coil pin has a higher coefficient of thermal expansion than the bracket.

2. The exhaust liner suspension system of claim 1 wherein the coil pin comprises a metal sheet wrapped to form a coil, wherein the coil provides a dampened connection between the hanger and the bracket.

3. The exhaust liner suspension system of claim 2 wherein the metal sheet is wrapped around its center axis approximately 2.0-2.25 times.

4. The exhaust liner suspension system of claim 1 wherein the coil pin compresses when inserted in the hinge pin bore.

5. The exhaust liner suspension system of claim 1 wherein the coil pin produces an interference fit with the hinge pin bore.

6. The exhaust liner suspension system of claim 1 wherein the coil pin contacts approximately 270° to approximately 315° of the hinge pin bore.

7. The exhaust liner suspension system of claim 1 wherein the coil pin is pressed fit with the hinge pin bore.

8. The exhaust liner suspension system of claim 1 wherein:
   the hinge pin bore comprises a circular bore;
   the coil pin is compression fit into the hinge pin bore; and
   the hinge pin socket comprises an oval bore configured to rotate about and translate uni-directionally against the coil pin.

9. An exhaust liner suspension system for use in a gas turbine engine exhaust duct, the suspension system comprising:
   a hanger comprising:
      a first end for connecting with an exhaust duct; and
      a second end having an oval hinge pin socket;
   a bracket comprising:
      a base for connecting with an exhaust duct liner; and
      a pedestal having a circular hinge pin bore; and
   a coil pin insertable in the hinge pin socket and the hinge pin bore thereby pivotably connecting the hanger and the bracket;
   wherein the hinge pin bore is sized to compress the coil pin and the hinge pin socket is sized to permit rotation and uni-directional translation of the hanger with respect to the coil pin.

* * * * *